United States Patent [19]

Yamada et al.

[11] 3,992,647
[45] Nov. 16, 1976

[54] SYSTEM FOR BEAM LANDING CORRECTION IN COLOR CATHODE RAY TUBE IN THE EARTH'S MAGNETIC FIELD

[75] Inventors: Mitsuyoshi Yamada; Hideo Hatada, both of Tokyo; Masato Izumisawa, Yokosuka; Hiromasa Machida, Mitaka; Norihide Furuyama, Chiba, all of Japan

[73] Assignee: Sony Corporation, Tokyo, Japan

[22] Filed: Feb. 21, 1975

[21] Appl. No.: 551,625

[52] U.S. Cl. .............................. 315/379; 315/370; 315/368; 315/13 C; 315/375
[51] Int. Cl.² .................................. H01J 29/76
[58] Field of Search ............... 315/368, 13 C, 370, 315/379, 375

[56] References Cited
UNITED STATES PATENTS

| | | | |
|---|---|---|---|
| 3,668,464 | 6/1972 | Tokita et al. | 315/368 |
| 3,798,496 | 3/1974 | Kouber | 315/368 X |
| 3,887,833 | 6/1975 | Yamazaki | 315/13 C |

Primary Examiner—Maynard R. Wilbur
Assistant Examiner—David Leland
Attorney, Agent, or Firm—Lewis H. Eslinger; Alvin Sinderbrand

[57] ABSTRACT

A system for compensating for mislanding of electron beams in a color cathode ray tube, which comprises a coil device provided on the color cathode ray tube in addition to a main deflection coil, a circuit for producing a plurality of currents having different wave forms, respectively, and a connecting device for connecting the coil device to selected one of connection points of the circuit so as to supply one or more of the currents produced in the circuit, which has a desired wave form, to said coil device selectively in response to the direction to which the color cathode ray tube faces, thereby to achieve sufficient compensation for mislanding of electron beams caused by the earth's magnetic field regardless of the directional situation of the cathode ray tube.

5 Claims, 8 Drawing Figures

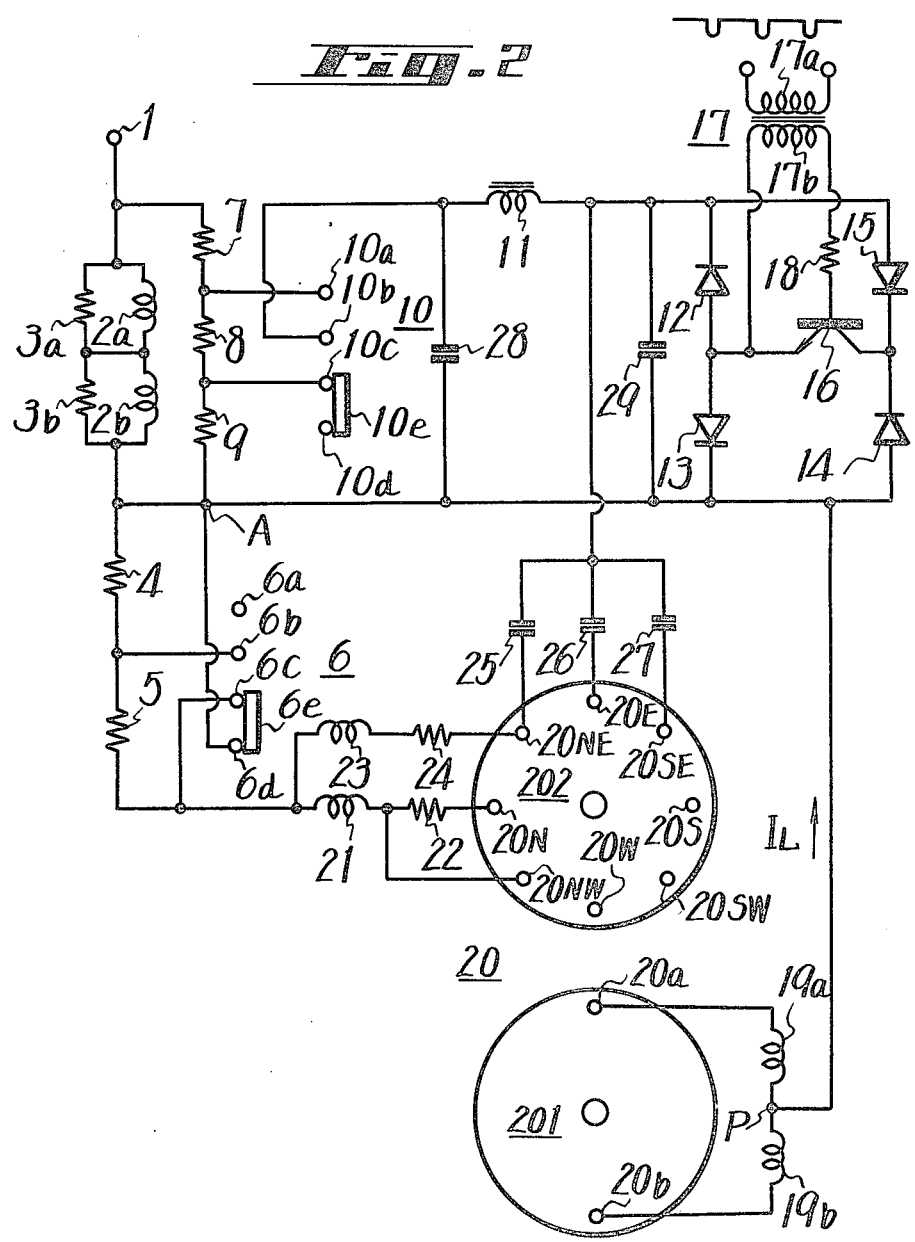

a SYSTEM FOR BEAM LANDING CORRECTION IN
COLOR CATHODE RAY TUBE IN THE EARTH'S
MAGNETIC FIELD

BACKGROUND OF THE INVENTION

1. Field pf the Invention

This invention generally relates to color purity correction in color television receivers, and more particularly is directed to an improvement in system for correcting beam landing in color cathode ray tubes which tends to be harmfully affected by the earth's magnetic field.

2. Description of the Prior Art

Generally, in the color cathode ray tube of a color television receiver, the current values of independent three electron beams, which may impinge upon three phospors for emitting three primary colors or red, green and blue colors (therefore, three electron beams will be hereinafter referred to as R-beam, G-beam and B-beam, respectively), are controlled to adjust the emitting intensities of three colors to thereby reproduce an image of arbitrary color. In this case, if the R-beam, G-beam and B-beam are not landed on the corresponding red, green and blue phosphors correctly, the color of the reproduced picture is deteriorated. For example, if the R-beam impinges upon the green phosphor, the fidelity of the color television receiver for reproducing color is spoiled. In general, the electron beams in a color cathode ray tube pass through an area in which horizontal and vertical deflection magnetic fields present, and thereafter advance substantially straight for the R, G and B-beams to impinge upon the predetermined red, green and blue phosphors on the inner surface of the face panel of the color cathode ray tube respectively. In fact, however, as well known, the electron beams are affected bu the earth's magnetic field, then deflected reluctantly and reached to positions displaced from the proper positions on the inner surface of the face panel in the cathode ray tube to become such a state that the respective electron beams do not impinge upon the correct phosphors or a so-called "mislanding", which deteriorates the color of a reproduced picture as described previously is caused. Since the influence of the earth's magnetic field becomes different in accordance with the position where the color television receiver is situated and the direction of the face panel of the cathode ray tube, the mislanding of electron beams also become different in accordance with the located position of the television receiver and the direction of the face panel.

In the art, there is proposed the system in which a coil is located around the funnel portion or peripheral portion of a cathode ray tube and a predetermined value of DC current is supplied to the coil to establish DC magnetic field so as to cancel the earth's magnetic field affecting the electron beams badly. However, with such a prior art system which produces the DC magnetic field as the correction magnetic field, it is difficult to produce correction magnetic field which may suitably follow up the influence of the earth's magnetic field which may suitably follow up the influence of the earth's magnetic field which influence changes in accordance with the direction of a cathode ray tube, and accordingly the mislanding can not be compensated for sufficiently.

SUMMARY OF THE INVENTION

According to an aspect of the present invention there is provided a system with which, based upon the fact that the mislanding of electron beams of a color television receiver caused by the influence of the earth's magnetic field occurs with a constant regularity relative to the direction of the face panel of the cathode ray tube or, for example, the direction of the face panel of the cathode ray tube lies in the east-west direction, the mislanding appears in a trapezoid shape, when the direction of the fact panel lies, in the south-north direction, the mislanding appears in a paralleloram shape and when the direction of the fact panel lies in the north-east, north-west, south-east and south-west directions, the mislanding appears in a combined shape of those of the east-west and south-north directions, a coil provided in association with the cathode ray tube is supplied with a current whose wave form is varied in accordance with the direction of the cathode ray tube to produce a correction magnetic fields so as to compensate for the mislandings.

It is an object of the present invention to provide improved systems for beam landing correction in color television receivers so as to eliminate insufficiency in the correction by previously proposed systems.

Another object of the present invention is to provide improved systems for compensating for beam mislanding caused by the effect of the earth's magnetic field in color cathode ray tubes, which achieves sufficient compensation required to be arranged in response to the direction in which the color cathode ray tube faces.

Other objects, features and advantages of the invention will become apparent from the following description taken in conjunction with the accompanying drawings.

BRIEF DESCRIPTION OF THE DRAWINGS

FIG. 2 is a connection diagram showing an embodiment of the circuit according to the invention which produces a current supplied to a landing correction coil of the system for beam landing correction in a color cathode ray tube of the invention;

DESCRIPTION OF THE PREFERRED EMBODIMENT

With reference to the drawings, an embodiment of the system for beam landing correction in a color cathode ray tube according to the invention will be hereinafter described.

Figure 1:
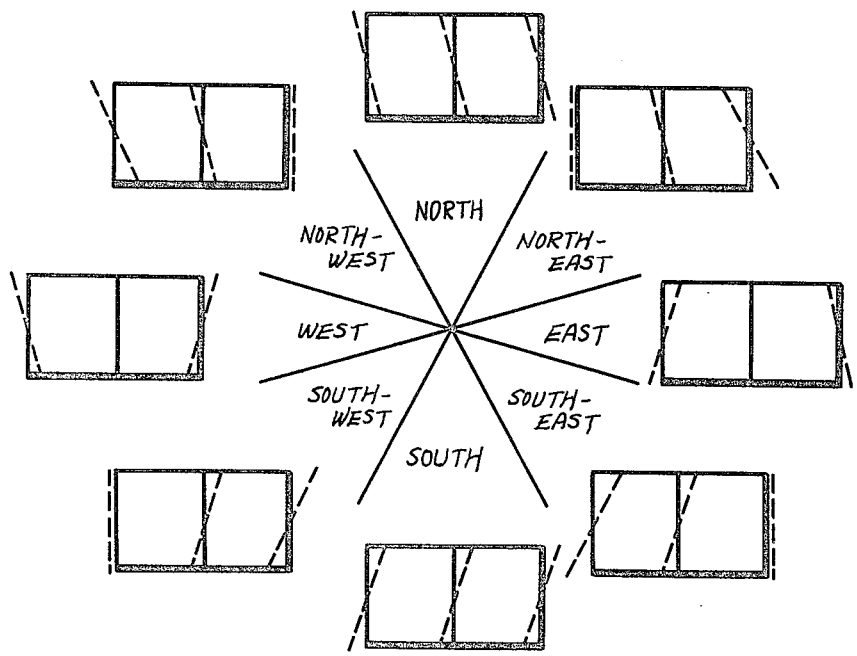
FIG. 1 is a schematic diagram used for explaining the system for beam landing correction in a color cathode ray tube according to the invention.

FIG. 1 is a schematic diagram showing an example of the mislandings of an electron beam. In FIG. 1, the illustrated directions show the directions of the picture screen of a television receiver or the face panel of its cathode ray tube. As may be obvious from FIG. 1, in accordance with the directions of the face panel of the television receiver, different mislandings occur. In FIG. 1, dotted lines show parts on which the electron beams impinge by the action of the horizontal component of the earth's magnetic field, and the deviations or displacements between the dotted lines and solid lines (which show the case where the electron beams impinge correctly) are the amounts of mislandings.

FIG. 2 shows an example of the system according to the invention. In this figure, reference numeral 1 indicates an input terminal which is supplied with a vertical deflection current. The input terminal 1 is connected through a series circuit, which consists of a parallel connection of a vertical deflection coil 2a and a resistor 3a and a parallel connection of a vertical deflection coil 2b and a resistor 3b, to one end of a resistor 4 whose other end is connected through a resistor 5 to a fixed contact 6c of a chage-over switch 6. The connection point between the resistors 4 and 5 is connected to a fixed contact 6b of the change-over switch 6. The input terminal 1 is further connected to the former end of the resistor 4 through a series connection of resistors 7, 8 and 9. The connection A between the resistors 4 and 9 is connected to a fixed contact 6d of the change-over switch 6 whose fixed contact 6a is opened. A slidable or movable contact 6e of the change-over swich 6 connects two of its fixed contacts such as the fixed contacts 6a–6b, 6b–6c, . The connection point between the resistors 7 and 8 is connected to a fixed contact 10a of a change-over switch 10 which is similar to the change-over switch 6. The connection point between the resistors 8 and 9 is connected to a fixed contact 10c of the change-over switch 10 whose fixed contact 10d is opened. A fixed contact 10b of the change-over switch 10 is connected through a choke coil 11 to the cathode of a diode 12 whose anode is connected to the anode of a diode 13. The cathode of the latter is connected to the connection point A between the resistors 4 and 9, and also to the anode of a diode 14 whose cathode is connected to the cathode of a diode 15. The anode of the latter is connected to the cathode of the diode 12. The connection point between the anodes of the diodes 12 and 13 is connected to the emitter of an NPN-type transistor 16. The emitter of the transistor 16 is connected through a seconday winding 17b of a horizontal output trasformer 17 and a resistor 18 to the base of the transistor 16 whose collector is connected to the connection point between the cathodes of the diodes 14 and 15. In this case, a primary winding 17a of the horizontal output transformer 17 is supplied with a negative pulse of the horizontal period H. The connection point between the cathode of the diode 13 and the anode of the diode 14 is connected through a dynamic landing correction coil 19a to one connection contact or point 20a which is formed on a rotatable or movable terminal plate 201 of a rotary switch 20 and also through a dynamic landing correction coil 19b to another correction contact or point 20b which is also formed on the movable terminal plate 201. In FIG. 2, reference letter P designates the connection point between the dynamic landing correction coils 19a and 19b. The connection point between the fixed contact 6c of the change-over switch 6 and the resistor 5 is connected through a series connection of a coil 21 and a resistor 22 to a connection point 20N which is formed on a fixed terminal plate 202 of the rotary switch 20 and also through a series connection of a coil 23 and a resistor 24 to a connection point 20NE which is also formed on the fixed terminal plate 202 of the rotary switch 20. The connection point between the coil 21 and resistor 22 is connected to a connection point 20NW formed on the fixed terminal plate 202. In this case, the rotary switch 20 is so formed that its fixed and movable terminal plates 202 and 201 can rotate in a click manner about the same axis or shift. Connection points are formed on the fixed terminal plate 202 with angular distance of 45°, and the connection points 20a and 20b formed on the movable terminal plate 201 contact with the connection points formed on the fixed terminal plate 202 with angular distance of 180°, for example, the connection points 20N and 20S, respectively.

In the embodiment shown in FIG. 2, the vertical deflection coils are connected in series with the dynamic landing correction coils 19a and 19b. In this case, in order to avoid that an excess current flows through the dynamic landing correction coil 19a, the movable contact 6e of the change-over switch 6 is moved to vary the composite resistance value of the resistors 4 and 5 which are connected in parallel to the dynamic landing correction coil 19a. That is, when the movable contact 6e connects the fixed contacts 6a and 6b, the series connection of the resistors 4 and 5 is connected in parallel to the dynamic landing correction coil 19a, while when the movable contact 6e connects the fixed contacts 6b and 6c, only the resistor 4 is connected in parallel to the dynamic landing correction coil 19a. Further, when the movable contact 6e connects the fixed contacts 6c and 6d, the parallel connection of the resistors 4 and 5 is connected in parallel to the dynamic landing correction coil 19b. The connection points 20NE, 20E and 20SE on the fixed terminal plate 202 are connected together through capacitors 25, 26 and 27 to the connection point between the choke coil 11 and diode 12. The both ends of the coil 11 ae connected together through capacitors 28 and 29 to the connection point A.

Figure 3:
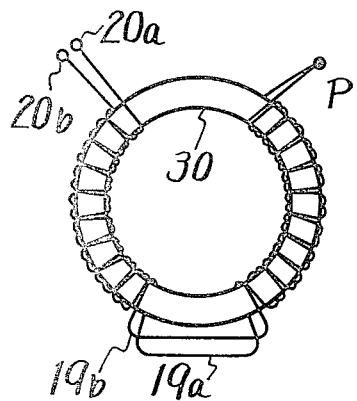

As shown in FIG. 3, the dynamic landing correction coils 19a and 19b are wound on a ring-shaped core 30 in opposite sense, and their one ends are connected to the connection points 20a and 20b on the movable plate 201 of the rotary switch 20, respectively.

Figure 4:
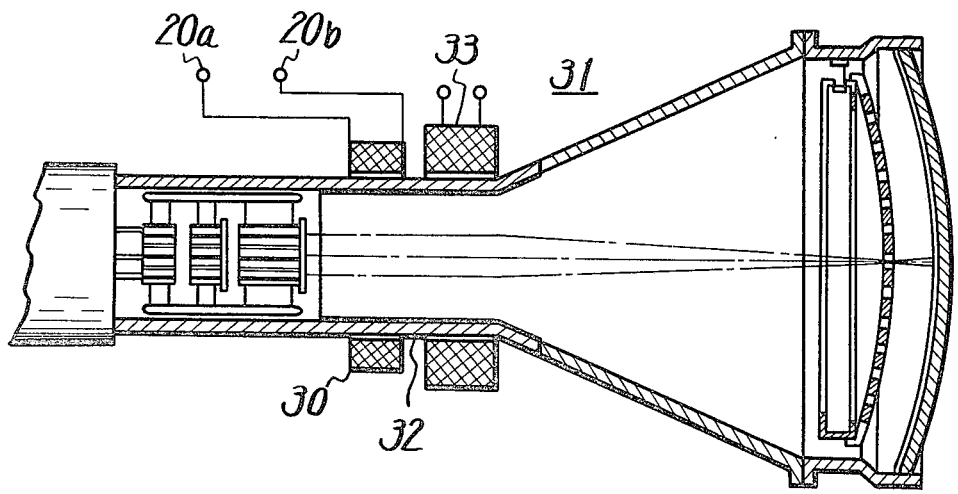
FIGS. 3 and 4 are schematic diagrams showing parts of the system for beam landing correction in a color cathode ray tube according to the invention, respectively.

FIG. 4 shows the state in which the ring-shaped core 30 with the dynamic landing correction coils 19a and 19b wound thereon is attached to a cathode ray tube 31 of a color television receiver. In detail, the ring-shaped core 30 with the dynamic landing correction coils 19a and 19b is attached around a neck portion 32 of the cathode ray tube 31. In FIG. 4, reference numeral 33 designates a deflection yoke.

A description will now be given on the operation of the system for beam landing correction in a color cathode ray tube according to the invention.

Figure 5:
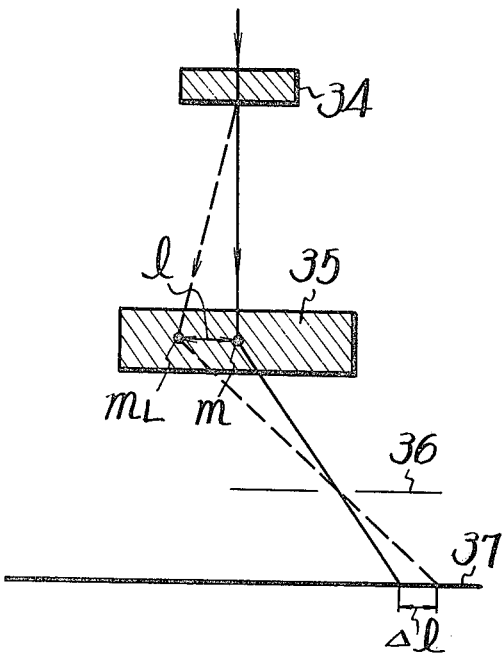
FIG. 5 is a schematic diagram used for explaining the theoretical operation of the system for beam landing correction in a color cathode ray tube of the invention.

FIG. 5 is a schemaic diagram showing the theory of the beam landing correction of the invention. In FIG. 5, reference numeral 34 designates the dynamic landing correction coil 35 the vertical deflection coil, 36 a slit such as an aperture electrode, a shadow mask or the like, and 37 a phosphor screen, respectively. In the case of FIG. 5, when there is presented no magnetic field established by the dynamic landing correction coil 34, a trace of the electron beam becomes as shown by a solid line with the direction by arrows, but when there exists the magnetic field, the electron beams travels as shown by a dotted line with the direction by arrows in FIG. 5. In other words, the beam deflection center $m_L$ in the case where there exists the magnetic field moves by a distance $l$ from the beam deflection center $m$ in the case where the magnetic field is not present. In this case, since the relative position of the slit 36 to the phosphor screen 37 is not changed, the landing position of the electron beam on the phosphor screen 37 is shifted by $\Delta l$ between the cases.

The mislanding of the electron beam caused by the earth's magnetic field in the color television receiver is corrected based upon the above theory. In this case, the wave form of a current, which may be supplied to the dynamic landing correction coils 19a and 19b, is formed to be desired ones in accordance with the direction of the face panel of the cathode ray tube of the color television receiver to correct the mislanding correctly.

Figure 6A:
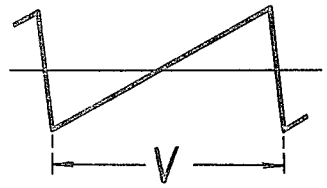
FIGS. 6A, 6B and 6C are wave form diagrams used for explaining the system for beam landing correction in a color cathode ray tube of the invention.

When the face panel of the cathode ray tube of the color television receiver faces, for example, the north, the movable contact 10e of the change-over switch 10 is moved to connect the fixed contacts 10c and 10d with each other, the change-over switch 6 is so connected that no excessive current is supplied to the dynamic landing correction coil, and the movable terminal plate 201 of the rotary switch 20 is rotated such that the connection points 20a and 20b on the movable terminal plate 201 are connected to the connection points 20N and 20S on the fixed terminal plate 202, respectively. Thus, a sawtooth wave form current shown in FIG. 6A, which flows through the vertical deflection coils 2a and 2b, can flow through the dynamic landing correction coil 19a, so that the mislanding of the electron beam caused by the earth's magnetic field in the case of the face panel of the cathode ray tube facing the north as shown in FIG. 1, can be corrected. When the face panel of the cathode ray tube faces the south, the rotary switch 20 is so operated that the connection points 20a and 20b on the movable terminal plate 201 are connected to the connection points 20S and 20N on the fixed terminal plate 202. As a result, a sawtooth wave form current with the same phase as that of the sawtooth wave form current as shown in FIG. 6A flows through the dynamic mislanding correction coil 19b. In this case, since the coils 19a and 19b are wound in opposite sense, the coil 19b produces the magnetic field opposite in direction to that from the coil 19a. Therefore, the mislanding of the electron beam caused by the earth's magnetic field in the case of the face panel of the cathode ray tube facing the south can be corrected.

Figure 6B:
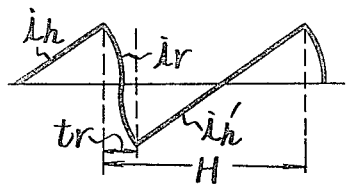

When the face panel of the cathode ray tube faces the east, the rotary switch 20 is so operated that its connecting points 20a and 20b on the movable terminal plate 201 are connected to the connecting points 20E and 20W on the fixed terminal plate 202, respectively, and the change-over switch 6 is connected such that the current applied to the dynamic landing correction coil 19a is prevented from being excessive as in the case of the face panel of the cathode ray tube facing the north and south. Further, the chage-over switch 10 is so operated that its movable contact 10e switches the connection of the fixed contacts 10a and 10b or 10c and 10c. For example, when the movable contact 10e connects the fixed contacts 10a and 10b, a pulse voltage of the vertical period appeared across the vertical deflection coils 2a and 2b is formed as a sawtooth wave form of the vertical period by the integral circuit consisting of the resistor 7 and the capacitor 28. A negative pulse signal of the horizonal period is applied from the horizontal output transformer 17 to the base of the transistor 16. That is, the transistor is made ON during the latter half of the horizontal scanning period, and the current flowing the dynamic landing correction coil 19a flows through the circuit of the diode 14 — transistor 16 — diode 12. Thus, a current $I_L$ (refer to FIG. 2) increases with elapse of time as shown by a line $i_h$ in FIG. 6B, when a negative pulse of the fly-back period is applied to the base of the transistor 16, the transistor 16 is made OFF, the direction of the current $I_L$ is reversed as shown by a curve $i\gamma$ in FIG. 6B by the resonance of the dynamic landing correction coil 19a and the capacitor 29. During the former half of the horizontal scanning, the transistor 16 is made ON and the current $I_L$ flows through the diode 15 — transistor 16 — diode 13. Thus, the negative current $I_L$ increases gradually to zero as shown by a curve $i'_h$ in FIG. 6B. At the time when the current $i'_h$ becomes zero, the latter half of the horizontal scanning period is reached and the current $i'_h$ increases gradually. The above operation will be repeated thereafter. In this case, whether the voltage obtained by the integral circuit consisting of the resistor 7 and the capacitor 28 is positive or negative, the diodes operative therefor are changed only to achieve the above operation similarly.

Figure 6C:
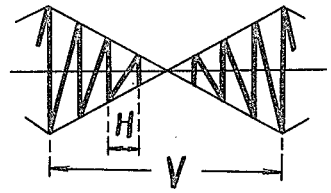

The thus obtained sawtooth wave form current of the horizontal period is amplitude — modulated with the sawtooth wave form voltage of the vertical period provided by the integral circuit consisting of the resistor 7 and the capacitor 28, so that, as shown in FIG. 6C, the amplitude of the sawtooth wave form current of the horizontal period decreases gradually during the former half of the vertical period, then is made zero at the center of the vertical period, then the sawtooth wave form current of the horizontal period is reversed in phase and its amplitude increases gradually from zero during the latter half of the vertical period. If the current with the wave form shown in FIG. 6C is applied to the dynamic landing correction coil 19a, the mislanding of the electron beam by the earth's magnetic field in the case of the face panel of the cathode ray tube facing the east shown in FIG. 1 can be corrected.

When the face panel of the cathode ray tube faces the west, the connecting point 20a on the movable terminal plate 201 of the rotary switch 20 is connected to the connecting point 20W on the fixed terminal plate 202 of the rotary switch 20. In this case, a sawtooth wave form current same in phase with the sawtooth wave form current of the horizontal period shown in FIG. 6C flows through the dynamic landing correction coil 19b. Since the coil 19b is wound in opposite sense to the coil 19a, the coil 19b produces the magnetic field opposite in direction to that produced from the coil 19a to correct the mislanding of the electron beam caused by the earth's magnetic field when the face panel of the cathode ray tube faces the west.

If the face panel of the cathode ray tube faces the middle directions or north-east, surth-west, south-east and south-west, it is sufficient that both the correction currents in the cases where the face panel faces the south and north or east and west as described above are flowed through the dynamic landing correction coils 19a and 19b. By way of example, when the face panel faces the south-east, the connection points 20a and 20b on the movable terminal plate 201 of the rotary switch 20 are connected to the connection points 20SE and 20NW on the fixed terminal plate 202 of the rotary switch 20, respectively. Thus, the correction current for the mislanding where the face panel faces the south flows through the dynamic landing correction coil 19*b* and the correction current for the mislanding where the face panel faces the east flows through the dynamical landing correction coil 19*a* to thereby correct the mislanding of the electron beam caused by the earth's magnetic field when the face panel faces the south-east.

If the face panel faces the north-west, the rotary switch 20 is so operated that its connection points are connected reverse to the case where the face panel faces the south-east. Accordingly, the correction current for the case where the face panel faces the north flows through the dynamic landing correction coil 19*a*, and the correction current for the case where the face panel faces the west flows through the dynamic landing correction coil 19*b*.

If the face panel faces the north-east, the connection points 20*a* and 20*b* on the movable terminal plate 201 of the rotary switch 20 are connected to the connection points 20NE and 20SW on the fixed terminal plate 202 of the rotary switch 20, respectively. Thus, the correction currents for the cases where the face panels faces the north and west flow through the dynamic landing coil 19*a* in superimposed manner. Thus, the mislanding of the electron beam caused by the earth's magnetic field can be corrected.

If the face panel faces the south-west, the movable terminal plate 201 of the rotary switch 20 is so rotated that the correction currents for the cases where the face panel faces the south and west are flowed in superimposed manner through the dynamic landing correction coil 19*b*. Thus, the mislanding of the electron beam caused by the earth's magnetic field can be similarly corrected.

As described above, with the system for beam landing correction in color cathode ray tubes according to the present invention, any mislanding of electron beams caused by the earth's magnetic field can be corrected in accordance with the direction of the face panel of the cathode ray tube in the color television receiver by simple construction.

In the above example, the dynamic landing correction coils are wound on the ring-shaped core or formed as a toroidal type, but they can be formed as a sadddle type. Further the dynamic landing correction coils can be located between the deflection coil and the phosphor screen with the same effect.

The system of the invention can be applied for correcting the mislanding of electron beams caused by other magnetic field which may affect the electron beam similar to the earth's magnetic field.

It may be apparent that many modifications and variation could be effected by one skilled in the art without departing from the spirits or scope of the novel concepts of the invention.

We claim as our invention:

1. A system for dynamic beam landing correction in color cathode ray tubes having deflection means for producing horizontal and vertical electron beam deflection fields, said system comprising:
   a. additional deflection means including coil means provided on the color cathode ray tube for producing a magnetic electron beam deflection field in addition to the horizontal and vertical electron beam deflection fields so as to compensate for mislanding of the electron beam occuring on a screen of the color cathode ray tube;
   b. circuit means connected to said deflection means for generating a periodically varying current of a predetermined wave form to compensate for the beam mislanding, said circuit means being connected to said additional deflection means to supply the current to said coil means; and
   c. control means connected with said circuit means for changing the circuit means to change the wave form of said current supplied to said coil means in accordance with to the direction to which said color cathode ray tube faces.

2. A system according to claim 1, wherein said circuit means comprises means for producing a first sawtooth wave current of the vertical period and means for producing a second sawtooth wave current of the horizontal period amplitude-modulated by a triangle wave of the vertical period.

3. A system according to claim 2, wherein said control means is provided for arranging said curcuit means to supply one of said first and second sawtooth wave currents and both of said first and second sawtooth wave currents, selectively, to said coil means in response to the direction to which said color cathode ray tube faces.

4. A system according to claim 3, wherein said control means comprises selective multiple connecting point switch means for connecting said coil means to selected one of connecting points of said circuit means.

5. A system according to claim 4, wherein said coil means comprises a pair of coils having winding directions opposite to each other, respectively, each of said coils being connected to said selected connecting point of said circuit means through said selective switch means selectively in response to the direction to which said color cathode ray tube faces.

* * * * *